Feb. 27, 1962

R. H. EFRAM ET AL

3,022,891

CARD SORTING SYSTEM

Filed Nov. 18, 1957

INVENTORS
RUDOLPH H. EFRAM
M. LAWRENCE APPLEBAUM
BY MORT HENRY

ATTORNEYS

Feb. 27, 1962   R. H. EFRAM ET AL   3,022,891
CARD SORTING SYSTEM

Filed Nov. 18, 1957   4 Sheets-Sheet 3

INVENTORS
RUDOLPH H. EFRAM
M. LAWRENCE APPLEBAUM
BY MORT HENRY
Cullen & Cantor
ATTORNEYS Feb. 27, 1962    R. H. EFRAM ET AL    3,022,891
CARD SORTING SYSTEM Filed Nov. 18, 1957    4 Sheets-Sheet 4

INVENTORS
RUDOLPH H. EFRAM
M. LAWRENCE APPLEBAUM
BY MORT HENRY

Cullen & Canton
ATTORNEYS

United States Patent Office 3,022,891
Patented Feb. 27, 1962

3,022,891
CARD SORTING SYSTEM
Rudolph H. Efram, 18950 Monica, M. Lawrence Applebaum, 4865 Sturtevant, and Mort Henry, 19465 Hubbell, all of Detroit, Mich.
Filed Nov. 18, 1957, Ser. No. 697,191
22 Claims. (Cl. 209—111.5)

This invention relates to a card sorting system and more particularly to an electrical system for selecting and rejecting individual cards and the like of the type which bear information indicia on their faces, such as business machine punch cards, from a large bundle of such cards.

A variety of business machine cards are in common use today to store and contain various types of information. One of the most common types of these cards are those which are hole punched in various places in predetermined columns along the cards and are selectively used to locate specific information from among large batches of these cards each bearing a different fragment of information. In order to select the particular card having the specific information desired, different types of classification equipment have been devised. However, the card classification equipment presently on the market is extremely expensive and complex, and thus, is not readily available to any but those having a great amount of use for such machines and particularly is not economically available to small offices and small businesses.

Thus, it is an object of this invention to provide a card sorting system capable of sorting out individually desired cards from among large batches of cards and the like bearing information indicia, to sort out those desired cards at high speed, and at the same time, to provide a system which is extremely inexpensive and relatively simple in operation.

Another object of this invention is to provide a card sorting system wherein a card is scanned by a detecting device which transmits an impulse in the case where an indicium is seen by the scanning device, or vice versa, depending upon how set, and wherein this impulse is fed into an electrical circuit which is pre-set to a desired pattern to correspond to the pattern of indicia on the specific cards desired, and which system transmits a signal, in response to the impulse, to a card rejection device in the event that any one of the indicia on the card being scanned does not correspond to the indicia pattern set into the electrical circuit. Thus, the card sorting system rejects a card upon a signal, and passes a card where there is no signal. Where there is no signal, the card corresponds to the pattern set on the machine, and thus, is a desired card.

In this system, it can be seen that there is no need for any memory circuits or information storing circuits, etc. All that is required is a single impulse due to a single indicia on a card not matching the pre-set conditions of the circuit corresponding to that particular indicia, for the system to reject that card.

These and other objects of this invention will become more apparent upon reading the following description of which the attached drawings form a part.

With reference to the attached drawings, in which:

FIG. 4 is a schematic view of the electrical circuit formed to receive impulses from the scanning device which scans the card and to transmit a signal to reject a card where the card does not match the setting of the circuit.

THE CARD SORTING MACHINE

Figure 1:
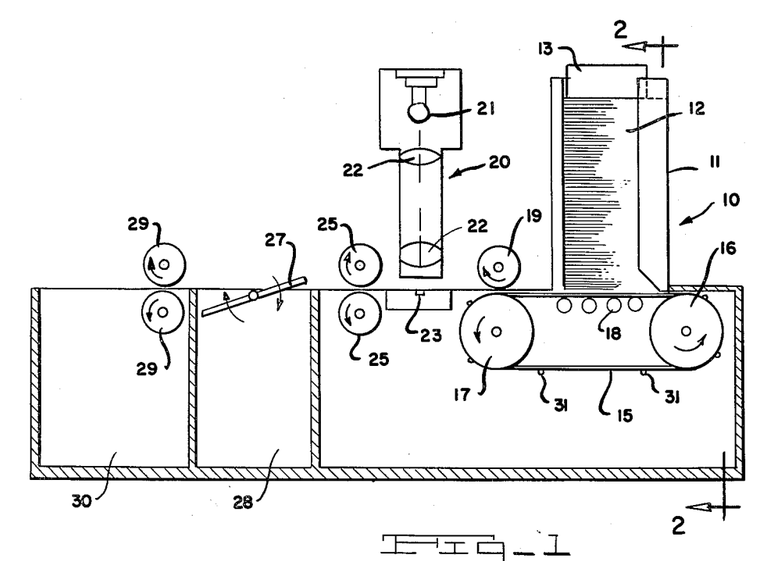
FIG. 1 is a schematic view of a complete machine formed to feed cards, one by one, out of a bundle of cards, through a scanning device and then into a reject bin or, in the alternative, to pass the cards through for acceptance.
Figures 2, 3:
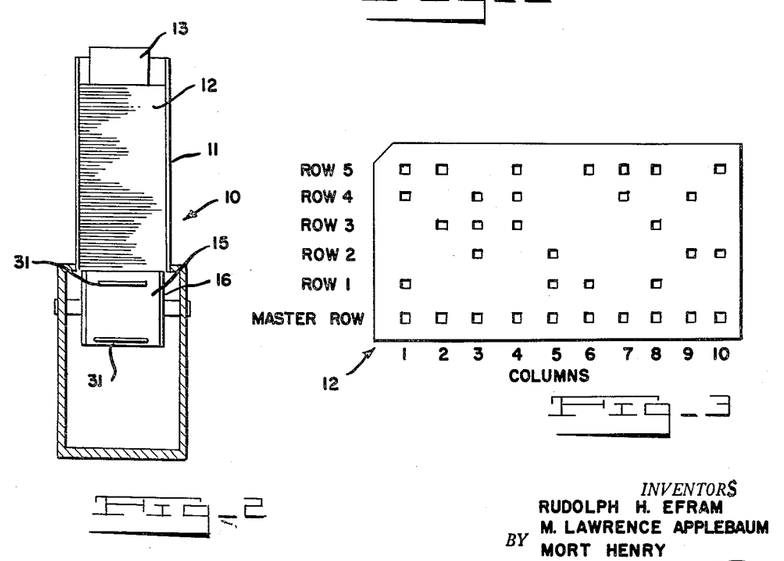
FIG. 2 is a side view taken in the direction of arrow 2 on FIG. 1.
FIG. 3 is a view of the face of an information type, business machine card of the punched variety having punched holes set in patterns thereon.

While the invention hereof is capable of being used on any type of information storing means wherein indicia are either present or not present to indicate information, the description hereof is related in terms of punched cards, such as shown in FIG. 3, in order to illustrate the operation of the invention, which is more directly concerned with the circuitry and the electrical system. Thus, in FIG. 1, a card sorting machine is generally and schematically illustrated merely by way of illustration of the use of the invention.

The card sorting machine, generally designated as 10, is formed with a hopper 11 in which the cards 12 are placed in a pile or bundle. A weight 13 may be placed on top of the cards to force them down in the hopper. The cards are picked up and carried out of the hopper bottom, one by one, by means of an endless feed belt 15 passing around rollers 16 and 17. The rollers may be powered by a suitable electric motor to move the belt and thus feed the cards. Support rollers 18 are arranged below the belt beneath the card bundle so as to level the cards and permit the cards to be fed flat from the hopper to the scanning device. An idler roller 19 is arranged over roller 17 and the cards 12 pass, one by one, between rollers 17 and 19 into the scanning station 20.

The scanning station 20 consists of an optical system having a light source 21 to shine light through lenses 22 down to a bank of photo-sensitive elements 23. Each card is advanced through the photo-sensitive bank rapidly so that the light passes rapidly through each column of holes in the card, and until the card is picked up by rollers 25 which continue to pull the card through the scanning station. Where the card is to be rejected a rejection gate 27 is opened and the card drops into a rejection bin 28. Where the card indicia matches the setting of the electrical circuitry, it is fed through the rollers 29 and drops into an accepted bin 30.

To feed the cards on the belt 15, one by one, it is desirable to form little bumps or protuberances 31 on the surface of the belt with the protuberances being spaced apart a distance slightly more than an individual card and extending above the surface of the belt slightly less than the thickness of a card, thus grasping the cards, one by one, from the bottom of the bundle and feeding them towards the scanning station 20.

In this illustration, the cards 12 are of the typical business machine variety, having punched holes in columns and rows. Thus, with reference to FIG. 3, the columns are numbered on the bottom below the card as columns 1, 2, 3, etc. and the rows are also numbered as they go horizontally across the card, with the bottom row being indicated as being the master row. In this type of card, the master row would have a punched opening corresponding to each column on the card and the remaining rows would have openings punched in those places where information is desired to be punched into the card. The master row may, of course, be placed on any convenient part of the card.

The sorting circuit

A complete schematic diagram of the sorting circuit and the stepping switch means, for successively advancing each of the columns of the sorting circuit, and also the rejection solenoid system is shown in FIG. 4. However, for purposes of explanation the signal system of the circuit will be explained first with reference to FIG. 5 which is a portion of the circuit shown in FIG. 4.

Figure 5:
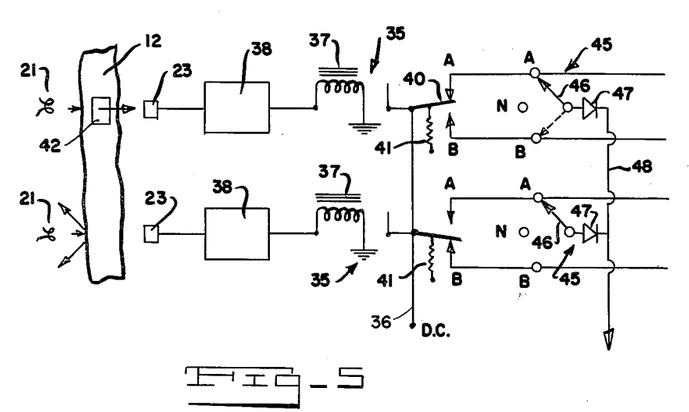
FIG. 5 is a schematic view of a portion of FIG. 4 to illustrate the operation of the circuit.

Thus, with reference to FIG. 5, a column of relays 35 are arranged in such a way that each relay corresponds to one place in a single column on the cards being sorted, where an indicium, such as a punched hole, may or may not appear. The relays 35 are connected together by a power line 36 connected to a D.C. source. The coils 37 of the relays 35 are connected electrically to amplifiers 38, and then to photo-sensitive elements 23 of any suitable type, such as cadmium or lead sulphide cells which transmit an electrical impulse upon exposure to light. Each relay has two positions, an up A position and a down B position. The leaf of the relay 40 is held down by a spring 41 into the contact B position and switches into the A position against the tension of the spring 41 when the relay coil 37 is energized by an impulse transmitted from the photo-sensitive element 23.

Thus, in operation, light from the light source 21 passes through a punched opening 42 in the card 12 to strike the photo-sensitive element 23, which generates an impulse which it transmits to the amplifier 38. The impulse is amplified and then operates the relay coil 37 to thus throw the relay leaf 40 into the up A position. This is illustrated in the top row of the two rows of FIG. 5. In the bottom row, it can be seen that where there is no punched hole, the light from the source 21 bounces back off the card, and thus, the leaf 40 remains in its down B position because of the spring 41.

Three pole selector switches 45 are electrically connected to each of the relays as shown, for example, in FIG. 4. The selector switch is provided with an arm 46 which may be manually movable and set in any one of three pole positions, namely, position A corresponding to position A on the relay, position B, corresponding to position B on the relay and position N corresponding to a neutral position where the presence or absence of a hole is immaterial. These switches are connected through diodes 47 to a connector line 48 which leads to a stepping switch and then to the rejection mechanism. The diodes are essentially half-wave rectifiers which allow current to flow in the one direction through the switch arm 46 to the line 48, and which act as one way valves to prevent sneak paths back through the switch arms.

The operation of this circuit will now be described. The basic principle of operation of this circuit is that a signal will be transmitted where any single, particular place in any single column and row on the punched card does not correspond to either the hole or no-hole setting of the selector switch 45.

Thus, in FIG. 5, the switches 45 in the two rows are each set for a desired no-hole or no-indicium and will transmit a signal only when a hole appears on a card being scanned. Note that the switch arms 46 are placed in the A position in each of the switches 45. In the top row, however, a hole 42 is present in the card 12 being scanned and consequently an impulse is transmitted by the photo-sensitive element 23 and the switch arm 40 of the relay 35 is thrown into the A position to thereby transmit current from the D.C. source through power line 36 through position A of the relay, through switch arm 46 and then down through the line 48 to thereby send a signal to operate the rejection device which will throw out the card.

Note, that in the lower row, no signal is generated by the lower photo-conductor element 23 and therefore, the relay arm 40 remains in its B position so that there is no circuit completed for the flow of current from the D.C. source and line 36 through the lower switch arm 46. However, one signal from either one of these two circuit stations, or, in fact, from any other single circuit station is enough to reject the card.

Now, assuming that a hole is desired in the top row, but not in the bottom row, then the arm 46 of the bottom row three pole switch 45 would be set in the A position, and the arm 46 in the top row switch 45 would be set in the B position (as shown in dotted lines). In this situation, the bottom row would operate the way described above. However, in the top row when the relay leaf 40 goes into the A position because of the presence of hole 42, the three pole switch arm 46 being in the B position will not transmit current. Consequently, there will be no signal from either the top row or from the bottom row and the card will have passed at least this part of the test towards remaining in the accepted bundle.

As can be seen in FIG. 4, there are a number of columns of these switches which are all identically connected to the single relays in the rows and each switch operates in the same manner as described in conjunction with FIG. 5. In each case, where the indicia or lack of indicia on the card matches the setting of the switch arm 45, there will be no signal transmitted and thus, the card will remain. But as soon as one signal is transmitted because any one indicium on the card fails to match the setting of the switch arm 46 of its respective switch, then the card will be rejected. In FIG. 4, columns of three pole switches are labeled column 1, column 2, and column 3, etc., with as many columns, and rows of switches being used as there are columns and rows of indicia on the particular type of cards being sorted.

The stepping switch operation

Because the cards speedily pass through the scanning device so that its columns are successively scanned at high speed, it is necessary to advance the corresponding columns of three pole switches 45 at the same speed. Thus, a stepping switch is used which jumps from one column of switches to the next column at a rate corresponding to the rate of advance of the columns of the card under the scanning device.

Figure 6:
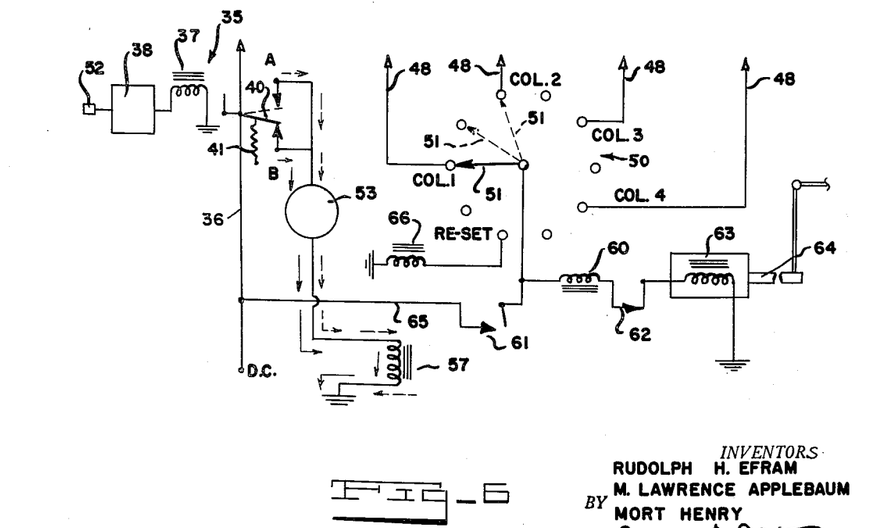
FIG. 6 is a view of the stepping switch portion of the circuit of FIG. 4 to illustrate the circuit stepping switch jumping from one column position to another column position as the card is advanced column by column under the scanning device.

With reference to FIG. 6, the construction and operation of a suitable stepping switch circuit is illustrated. FIG. 6, represents a portion of the circuit of FIG. 4 namely, the stepping switch and reject solenoid portion.

The stepping switch 50 is formed with an arm 51 which is arranged to jump from column stations labeled column 1, to a neutral dead or mid-point position, then to column 2 position and so forth all the way around 360° until it returns to a re-set position. The switch goes through its entire 360° motion whether or not the card is rejected and each time returns to the column 1 position in time to read the first column of the next card being scanned.

To operate the stepping switch, a photo-sensitive element 52 is arranged to correspond with the master opening or punched hole formed in the master row on the card being sorted. Thus, each time the card master hole passes over the master row photo-sensitive element, the light striking the element causes the element to transmit an impulse which goes through an amplifier 38 to energize the coil 37 of a relay 35. This causes relay leaf 40 to jump into the A position. When the card advances, so that the space between adjacent holes covers the light sensitive element, the coil 37 is de-energized and the leaf 40 is spring urged back into its B position. The A and B positions are wired to the stepping switch solenoid 57 through a time delay device 53, such as the conventional resistance-capacitance time delay network or any conventional time delay relay which slows down the transmission of current.

Each time the switch leaf 40 contacts the A or the B position, current from the D.C. power source energizes the stepping switch solenoid 57. The stepping switch solenoid is mechanically connected by suitable mechanical means (not shown) to the arm 51 of the stepping switch to advance the arm a half-step each time the solenoid is energized. Switches of this type are commercially available and are well known to those skilled in the art. The time delay device delays or lags the jump of the stepping switch arm sufficiently so that each of the card columns is scanned by the scanning device and either a signal or a no-signal is transmitted through the arm 51 before it jumps into the next half step position.

To review, it can be seen that when light strikes the photo-sensitive element 52, the relay leaf 40 jumps into its A position (see dotted line position of leaf 40 in FIG. 6) and passes current from the D.C. source (see dotted line arrows in FIG. 6) to energize the stepping switch solenoid 57, to thereby jump the arm 51 into a mid-position. As the card advances between the two holes of column 1 and column 2, no light strikes the element 52 and the leaf 40 falls back to the B position because of the spring 41 (see solid line position of leaf 40 in FIG. 6). Again the solenoid 57 is energized by current from the D.C. source (see solid line arrows in FIG. 6), and this advances the stepping switch arm another half position into the column 2 position. This is repeated column by column.

*Operation of the rejecting device*

As shown in connection with FIG. 6, the selector switch arm 51 simply goes around a 360° cycle and nothing further happens as long as the card being scanned has its indicia positions corresponding to the set positions of the three pole switches 45 in the various rows and columns. However, in the case where one of the card indicia does not match one of the pre-set three pole switch 45 positions A or B (as the case may be), an impulse or signal is sent down through line 48 (see FIG. 7), through the stepping switch arm 51, through the coil 60 of normally open switch 61, through the leaf 62 of a normally closed switch, and through a solenoid 63 (see solid line arrows) which solenoid operates a plunger 64 to then operate a mechanical linkage system (not shown) to open rejection gate 27, as illustrated in FIG. 1.

Figure 7:
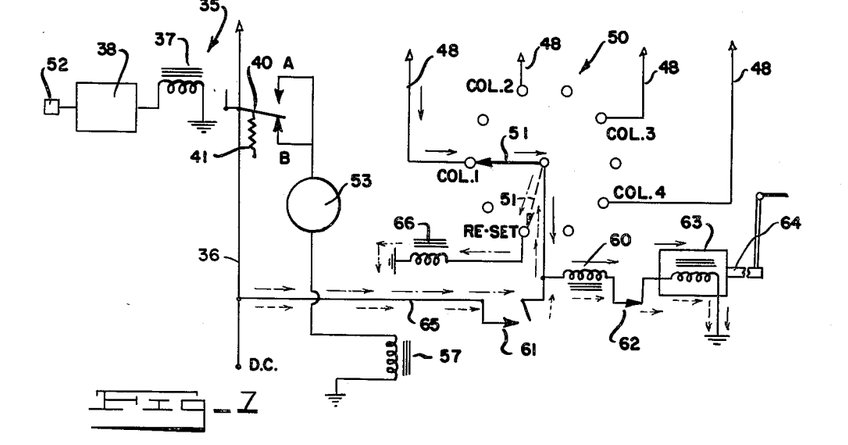
FIG. 7 is a view similar to FIG. 6, but shows the operation of the rejection system.

The energization of the normally open switch coil 60 closes the switch leaf 61 so that the switch 61 is connected through a power line 65 to the D.C. source and thus current passes through the line 65, through the leaf 61, through the energization coil 60 to the switch 61 and through the normally closed switch 62 see dotted line arrows in FIG. 7) to maintain the solenoid in its open position and thus, hold the rejection gate open. The card being scanned continuously advances under the scanning device 20, but when it reaches the rejection gate, the gate is open and the card falls into the reject bin 28.

When the stepping switch arm 51 reaches the re-set position, that is, after it has completed its 360° cycle, current from power line 65 passes through the arm 51, through the switch re-set pole, to energize the coil 66 which operates the normally closed switch 62. Coil 66 throws the switch 62 open, thereby de-energizing coil 60 to open switch 61. When switch 61 opens, the solenoid 63 is de-energized and the plunger 64 returns to its normal position under spring urging (spring not shown) to thus close the gate 27 preparatory towards scanning the next card. When the arm 51 again begins its cycle and leaves the re-set position, coil 66 is de-energized and switch 62 closes again.

*Operation of complete circuit*

FIG. 4 shows the entire circuit assembly in a schematic form. It can be seen, that the photo-sensitive elements may be replaced by any other suitable indicia detecting means which transmit an impulse on either the presence or absence of a particular indicium. Likewise, the indicium need not be a punched hole on a card, but might be some sort of sensitized section on a tape, or it might be a mark of some sort on a card or tape or photograph or the like which can actuate a sensing unit. The principle of operation remains the same, however; that is, that a signal will be passed from the three pole switch corresponding to the particular indicia when the indicia and the switch setting do not correspond and this single signal will operate the reject system. Once the reject system is operated, no matter how many more reject signals are transmitted in all or none of the other three pole switches, the reject device still has been operated and that particular card being scanned is rejected.

*Modified stepping switch*

The stepping switch described above, is of an electro-mechanical variety. However, at times it may be desirable to use a completely electrical or electronic stepping switch system which may operate more quickly and with fewer repair and replacement problems. Thus, with reference to the modification of FIG. 8, wherein the three pole switches, relays, photo-sensing devices and amplifiers are all identical, a different type of stepping switch is used.

Figure 8:
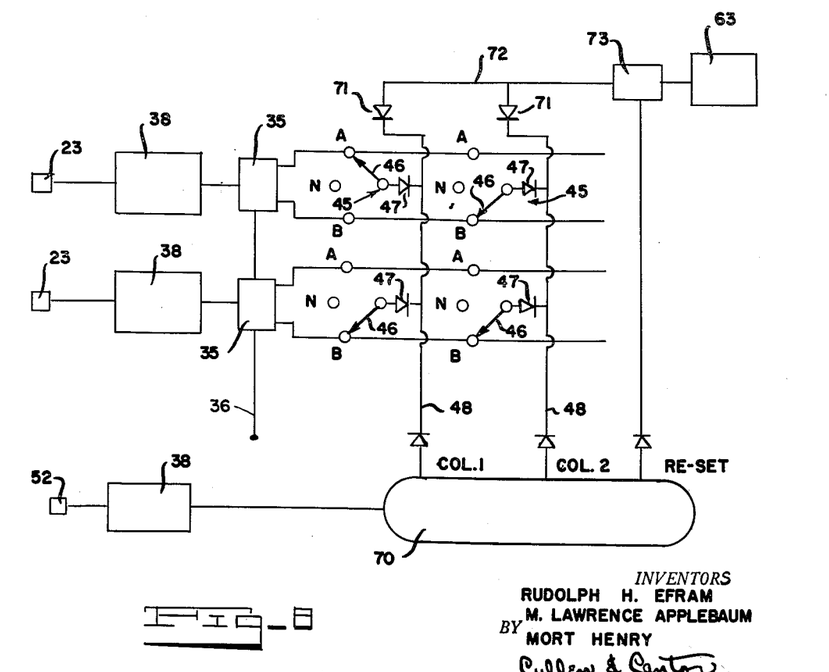
FIG. 8 is a view somewhat similar to FIG. 4 but shows a modified selector switch system and also eliminates the repeated number of circuit switch sections for purposes of clarity.

This modified stepping switch designated as 70, is in the form of a standard counter-tube. This is a tube which provides a voltage output at various output connections along the tube in response to a control signal. Each control signal advances the voltage output to the next successive output connection.

The operation of this counter-tube 70, is such that a voltage of a predetermined value appears at the connection to each of the column lines 48, successively, in response to the impulse received from the master row photo-sensitive element. The counter-tube output voltage appears at the re-set position which is the last position on the counter-tube after jumping successively through all the switch column connections.

Since counter-tubes are conventional devices and those skilled in the art would know how to apply them in this case, once told how to use such a tube in a system of this type, the tube itself is not described in detail here. It is sufficient to say, that a predetermined voltage will appear at each column line 48 in successive order corresponding to the successive scanning of the columns of indicia on the card being sorted.

The principle involved here, however, is that the voltage from the counter-tube is not sufficient to pass through a diode 71 arranged in each one of lines 48. The diodes here effectively act as resistors which prevent the flow of current until a predetermined voltage is reached, at which time they break down and pass current. Thus, when a signal or impulse passes through the arm 46 of one of the three pole switches 45, this signal added to the voltage output of the counter-tube is sufficient to break down the resistance of the diode 71, and to thus pass a signal through a line 72 through the re-set system 73 and to operate the solenoid 63.

The re-set system 73 and the solenoid 63 may be in the same form as that previously shown in connection with FIG. 4. Likewise, the relays 35 (schematically shown) may be the same as that previously shown or any conventional all electric relay switch may be used in its place.

In operation, so long as no signal passes through the arm 46 of any of the switches 45, because the indicia on the card correspond to the setting of the switch, the voltage of the counter-tube is not sufficient to operate the solenoid. However, once any single one of the three-pole switches 45 passes an impulse at the same time as the column in which it is located is under the influence of the voltage of the counter-tube, then the diode 71 breaks down and current passes through the line 72 to operate the solenoid 63.

This invention may be further developed within the scope of the following attached claims. Accordingly, it is desired that the foregoing description be read as being merely illustrative of an operative embodiment of this invention and not in a strictly limiting sense.

We claim:

1. In a device for sorting cards and the like, of the type having indicia formed thereon in patterns, with the patterns arranged in columns so that the presence or absence of indicia in predetermined positions in such columns indicates information stored on the card or the like, an electrical circuit for receiving electrical impulses in response to the presence or absence of indicia in any particular column and for actuating a rejection means for rejecting those cards whose pattern of indicia do not correspond to a predetermined pattern set into the electrical circuit, said electrical circuit comprising a scanning device which is arranged to successively scan one column at a time and is arranged to detect the indicia in such column and further arranged to transmit an impulse in only one of the two situations where an indicium is present or absent in any particular place in the column, but not in both situations; a series of two position relay switches, each arranged to correspond with one position in a column where an indicium may appear, each relay being normally arranged in one of its two positions for the passage of electrical current but being switchable in the other of its two positions in response to an impulse transmitted by the scanning device; a three-pole selective switch for each relay, with one pole electrically connected to one of the two relay positions, another pole electrically connected to the other relay position, and the third pole being a dead, non-electrically connected point; the selective switches all being separately connected to a signal output line which in turn is connected to an electrically operated rejection device; an electric power source connected to each of the relays and arranged to pass electric current through whichever of the two positions the relay is switched in and then through any one of the three pole selector switches which is connected to that particular position of the relay, to thus operate the rejection device, and wherein the electric power source is normally connected to pass current to the normally arranged position of the relay, but upon an impulse generated by the scanning device which thus, causes the relay device to switch into its other position, will pass current through this second relay position.

2. A device for sorting cards and the like of the type having indicia formed thereon in columnar patterns, and with the presence or absence of indicia at different predetermined places in the respective columns indicating information stored on said cards, comprising a multi-position scanning means having a position corresponding to each place on a card where an indicium in a column may appear and each position being arranged to transmit an electrical impulse upon detection of an indicium; an electrical circuit means for receiving the impulses and arranged to transmit a signal to a card rejection device in any predetermined situation where the indicia or lack of indicia on any of said places in the card column does not correspond to a desired pattern set into the circuit; said circuit including a column of switches of a number corresponding to the number of places in the card column, the switches each being selectively adjustable to one of two poles, and a relay means electrically between each of the switches and the respective scanning position, the relay means each having a normally closed position connected to one pole of its respective switch and a second, scanning impulse actuated, position connected to another of the poles of its respective switch; the switches all being electrically connected to a signal output line for individually transmitting a signal to said line, the line being connected to a stepping switch means for transmitting a signal from any of the switches to an electrically operated card rejection means, and said stepping switch means being in the form of a power source impressing a voltage across the line and a resistance means also connected in said line and formed so as to normally block the flow of current due to the power source, but to permit the flow of current through said line when a signal from one of the switches is added to the line to thus increase the total voltage across the line, to thereby pass current to operate the rejection device.

3. A construction as defined in claim 2, and said circuit including a plurality of columns of three pole switches corresponding to the number of columns on the card being scanned, each column having a separate signal output line, with each of the switches in the columns being connected to the relay means and to its respective column signal output line, to a resistor means connected in said line identically, and said stepping switch means comprising a sequential counter-tube arranged to impress the voltage of the power source across each switch column line in sequence corresponding to each of the indicia columns being sequentially scanned at the same time, whereby each switch column is arranged sequentially to transmit a signal to the rejection device when a particular place on its corresponding indicia column does not correspond to the set position of its respective three pole switch.

4. A construction as defined in claim 3, and the counter-tube being sequentially advanced by a signal from a scanning means position arranged to scan a master indicium formed in each indicia column on the card being scanned.

5. A device for sorting cards and the like of the type having indicia formed thereon in columnar patterns, comprising means for scanning the columns and for passing a signal upon scanning an indicium, means for selectively transmitting current to a rejection device operating circuit in response to said signal, said rejection device operating a circuit comprising the coil of a normally open power relay to which a source of electrical power is electrically connected, a normally closed relay and a solenoid means which operates a linkage which places and holds a rejection device in operating condition, wherein when such current is transmitted through said circuit the solenoid means is operated as is the power relay, the power relay being connected to said circuit to transmit current from said power source to continuously actuate the solenoid means to hold the rejection device in rejection condition despite discontinuance of current flow from the selectively transmitting means, and means for opening said normally closed relay to interrupt the current flow to the solenoid means to thereby return the rejection device to a non-rejection condition upon completion of the scanning of each card.

6. A signal transmitting device comprising a plurality of pairs of signal input lines and a plurality of individual signal output lines; an identical number of identical two pole switches connected to each pair of input lines, with one pole on each switch being connected to one of its respective pair of input lines and the other pole of each switch being connected to the other of its pair of input lines to form a row of switches in each pair of input lines, each switch having an output, the outputs of each switch being connected to only one of the individual output lines, but with only one switch of each pair of input lines being connected to any one of the individual output lines to thus form a column of switches; each of the switches being selectively switchable so that only one of its pair of input lines is connected at any one time to its respective output line, and each switch having an electrical means connected between the switch output and its respective output line, which electrical means is formed to pass current from the switch output to the output line, but to block any flow of current from the output line back through the switch.

7. A construction as defined in claim 6 and including a single current output for all of the output lines and a stepping switch means for selectively connecting the output lines, one at a time, to the said single current output.

8. A construction as defined in claim 6 and a relay switch means for each pair of input lines, the relay switch means having two electrical current passing connections, one to one of its pair of input lines and the other to the opposite one of its pair of input lines, the relay switch means being normally closed in one of its two connections for normally passing the current to one of its pair of input lines, and being movable to its opposite connection in response to a signal received by the relay switch means to the other of the two current passing connections and each of the relay switch means being connected to an electrical power source for passing electrical current to one or the other of its pair of input lines.

9. A construction as defined in claim 8 and including a single current output for all of the output lines and a stepping switch means for selectively connecting the output lines, one at a time, in predetermined order, to the said single current output.

10. A construction as defined in claim 6 and wherein each of said switches has a dead position to which it may be switched, the dead position being not connected to either of the pair of input lines, for selectively disconnecting any particular switch from its pair of input lines.

11. In a device for sorting cards and the like, of the type having indicia formed thereon in patterns, with the patterns arranged in columns so that the presence or absence of indicia in predetermined positions in such columns indicates information stored on the card or the like, an electrical circuit for receiving electrical impulses in response to the presence or absence of indicia in any particular column and for actuating a rejection means for rejecting those cards whose pattern of indicia do not correspond to a predetermined pattern set into the electrical circuit, said electrical circuit comprising a scanning device which is arranged to successively scan one column at a time and is arranged to detect the indicia in such column and further arranged to transmit an impulse in only one of the two situations where an indicium is present or absent in any particular place in the column, but not in both situations; a series of two position relay switches, each arranged to correspond with one position in a column where an indicium may appear, each relay being normally arranged in one of its two positions for the passage of electrical current but being switchable in the other of its two positions in response to an impulse transmitted by the scanning device; a column of three-pole selective switches, one switch for each relay, each switch having one pole electrically connected to one of the two relay positions, another pole electrically connected to the other relay position, and the third pole being a dead, non-electrically connected point; the selective switches all being connected together by a circuit including an electrically operated rejection device; an electric power source connected to each of the relays and arranged to pass electric current through whichever of the two positions the relay is switched in and then through the three pole selector switch when the selector switch is connected to that particular position of the relay, to thus operate the rejection device, and wherein the electric power source is normally connected to pass current to the normally arranged position of the relay, but upon an impulse generated by the scanning device which thus, causes the relay device to switch into its other position, will pass current through this second relay position; and additional columns of three-pole switches, with each column arranged to correspond with a separate column of indicia on said card and each subsequent column of switches arranged identically to the first mentioned column relative to the series of relay switches, and a stepping switch formed to sequentially place each of said switch columns into electrical connection with the rejection device, whereby when each column of indicia is scanned, an electrical current flows through that three pole switch related to the particular card column place being scanned when that place does not correspond in indicia with the pre-setting of that switch; and means for successively adjusting the stepping switch for sequentially placing each switch column into connection with the switching device, said means including an impulse transmitted by the scanning device in response to scanning a master indicia in each column on the card and relay means responsive to said impulse to advance the stepping switch, column by column.

12. A construction as defined in claim 11 and including a current time delay means interposed between the stepping switch relay and the scanning device to delay the operation of the stepping switch a short space of time before it adjusts from one column of switches to the next to thereby permit current, if any, in that one column to pass to the rejection device and operate it.

13. A device for sorting cards and the like of the type having indicia formed thereon in a columnar pattern which pattern also forms rows transverse to the columns so that the place where individual indicium may appear in one column is identical to the place where individual indicium may appear in all other columns, and with the presence or absence of indicia at different predetermined places in the respective columns indicating information stored on said cards, and for rejecting all cards and the like, whose pattern of indicia does not conform to a predetermined pattern, upon detection of the first, single indicium which does not conform to the predetermined pattern, said device comprising a multi-position scanning means formed in a single column and having a single scanning element corresponding to each position where an indicium may appear in each single card column; the scanning elements each being characterized as transmitting a signal upon detection of an indicium; a column of relays equal in number to the number of scanning elements and each relay being connected to one scanning element, the relays each normally passing current from an electrical power source through one position, but changing to a second position, to thus pass current, upon receipt of a signal from its respective scanning element; columns of switches corresponding in number to the number of card columns to be scanned, each column having a switch electrically connected to one relay and all the switches in each separate column of switches being electrically connected together; each switch being selectively adjustable to pass current from its respective relay when the relay is in either one of, but not both of, its two positions; switch means for electrically connecting each successive switch column to an electrically operated card rejection means, with each successive column then being used in conjunction with a card column corresponding with it and to which its switches have been pre-set in response to whether or not an indicium is desired at that particular place in the card column which corresponds to that particular switch, whereby upon pre-setting of the individual switches of each column to correspond to the indicia conditions required on a desired card, a signal will be transmitted from each of the scanning elements each time it scans an indicium, which signal will shift the relay corresponding to that element, which in turn will pass an electric current through its particular switch in the particular column of switches then in use if that switch is set to pass such a current, which current will in turn operate the rejection device; the rejection device being provided with means which holds it in rejection condition upon once receiving a current from any single column switch, so that all further currents from any other column switch no longer effect the rejection device, and means for returning the rejection device into its non-rejection condition upon completion of the scanning of each card to be rejected.

14. In a device for sorting cards and the like, of the type having indicia formed thereon in patterns, with the patterns arranged in columns so that the presence or absence of indicia in predetermined positions in such columns indiciates information stored on the card or the like, an electrical circuit for receiving electrical impulses in response to the presence or absence of indicia in any particular column and for actuating a rejection means for rejecting those cards whose pattern of indicia do not correspond to a predetermined pattern set into the electrical circuit, said electrical circuit comprising a scanning device which is arrenged to successively scan one column at a time and is arranged to detect the indicia in such column and further arranged to transmit an impulse in only one of the two situations where an indicium is present or absent in any particular place in the column, but not in both situations; a series of two position relay switches, each arranged to correspond with one position in a column where an indicium may appear, each relay being normally arranged in one of its two positions for the passage of electrical current but being switchable in the other of its two positions in response to an impulse transmitted by the scanning device; a column of three-pole selective switches, one switch for each relay, each switch having one pole electrically connected to one of the two relay positions, another pole electrically connected to the other relay position, and the third pole being a dead, non-electrically connected point; the selective switches all being connected together by a circuit including an electrically operated rejection device; an electric power source connected to each of the relays and arranged to pass electric current through whichever of the two positions the relay is switched in and then through the three pole selector switch when the selector switch is connected to that particular position of the relay, to thus operate the rejection device, and wherein the electric power source is normally connected to pass current to the normally arranged position of the relay, but upon an impulse generated by the scanning device which thus, causes the relay device to switch into its other position, will pass current through this second relay position; and additional columns of said selective switches corresponding to the card columns to be scanned, each column of said switches being successively connected to the one series of relay switches, so that each of said column switches corresponds to one of the places on the indicia pattern where an indicium may appear, and a switching means for sequentially placing each column of switches in use as its corresponding card column is scanned; said rejection device being provided with means for holding it in rejection condition upon receipt of current from any one of the column switches until that card then being scanned is replaced by the next card to be scanned.

15. A device for sorting cards and the like of the type having indicia formed thereon in columnar patterns of columns and transverse rows, and with the presence or absence of indicia at different predetermined places in the respective columns indicating information stored in said cards, comprising a scanning means formed to read one card column at a time and having a number of scanning elements, each scanning element corresponding to a single pre-determined place in the card column where an indicium may appear, the scanning means being formed to transmit an electrical signal from each of its scanning elements upon detection of an indicium at its respective place in the card column; an electrical circuit means for receiving said signal and for selectively transmitting an electrical current to a card rejection device for operating said device so that it is placed into a card rejection condition, said electrical circuit comprising a series of relay means each one corresponding to a row of indicia and each electrically connected to one of said scanning elements and each having a normal current transmitting position and a second, scanning position signal operated, current transmitting position; and a plurality of switches corresponding in number to the number of indicia positions on a card to be scanned with each switch corresponding to a particular indicium position, the switches corresponding to each column of indicia places being electrically connected together, and the switch corresponding to the rows of indicia places being connected with the relay for that particular row, each switch having a current transmitting position which corresponds to the normal current transmitting position of its respective relay means and a current transmitting position corresponding to the signal operated current transmitting position of its relay means, and the two switch positions being selective so that either one may be used at one time to either pass an electrical current or not, depending upon how set, from the relay means; and a stepping switch means for successively selecting the switches corresponding to each indicia column and placing them into use for operating the card rejection device as that particular indicia column is scanned, and said stepping switch means consisting of a means formed to impress a predetermined voltage successively across each line of switches corresponding to the column of indicia then being scanned, and a resistor means also connected in said line and formed so as to normally block the flow of current normally due to said predetermined voltage, but to permit the flow of current through said line when a current from any one of the switches is added to that line to thereby pass current to operate the rejecting device; said rejection device including a means for placing and holding it in rejection condition upon receipt of a current passing through any one of the individual switches and to disregard currents from any other switch, after receipt of a current passing through the first switch provides it with a current, until the card then being scanned is completed and the next succeeding card is scanned.

16. A device for sorting cards and the like of the type having indicia formed thereon in a columnar pattern which pattern also forms rows transverse to the columns so that the place where individual indicium may appear in one column is identical to the place where individual indicium may appear in all other columns, and with the presence or absence of indicia at different predetermined places in the respective columns indicating information stored on said cards, and for rejecting all cards and the like, whose pattern of indicia does not conform to a predetermined pattern, upon detection of the first, single indicium which does not conform to the predetermined pattern, said device comprising a multi-position scanning means formed in a single column and having a single scanning element corresponding to each position where an indicium may appear in each single card column; the scanning elements each being characterized as transmitting a signal upon detection of an indicium; a column of relays equal in number to the number of scanning elements, and each relay being connected to one scanning element, the relays each normally passing current from an electrical power source through one position, but changing to a second position, to thus pass current, upon receipt of a signal from its respective scanning element; columns of switches corresponding in number to the number of card columns to be scanned, each column having a switch electrically connected to one relay and each column having a signal output line and all of the switches in each separate column of switches being individually electrically connected to the signal output line of that column; each switch being selectively adjustable to pass current from its respective relay when the relay is in either one of, but not both of, its two positions; means for electrically connecting the signal output line of each successive switch column, one by one, successively, to an electrically operated card rejection means, at the same time as the card column corresponding with it is being scanned and to which its respective switches have been pre-set in response to whether or not an indicium is desired at their corresponding places in the card column, whereby upon pre-setting of the individual switches of each column to correspond to the indicia conditions required on a desired card, a signal will be transmitted from each of the scanning elements each time it scans an indicium, which signal will shift the relay corresponding to that element, which relay will pass an electric current through its particular switch in the particular column of switches whose signal output line is then connected to the rejection means if that switch is set to pass such a current, which current will then pass through that column signal output line to operate the rejection device.

17. A construction as defined in claim 16, and wherein the rejection device is formed with means which holds it in rejection condition upon once receiving a current from any single column switch, so that all further currents from any other column switch no longer effect the rejection device, and means for returning the rejection device into its non-rejection condition upon completion of the scanning of each card to be rejected.

18. An apparatus for locating and selecting data carriers carrying predetermined data from among a group of carriers, the carriers having their respective data stored in identically located columns having fixed data bearing positions in which data may be located; said apparatus comprising a scanning means, a signal transmitting means, and a selection means, said scanning means comprising scanning elements each formed to scan one data position and all arranged to simultaneously scan one column, and each arranged to separately transmit an electrical impulse in response to data scanned; said signal transmitting means comprising a column of identical switches equal in number to the number of positions in a carrier column, a power supply line and a signal output line; each switch having two input poles and an output pole with switch means for selectively connecting either of the two input poles, but not both simultaneously, to the output pole which in turn is connected to the signal output line; a relay means electrically connected to and operative in response to an impulse from a single scanning element to selectively connect one of the two input poles, but not both simultaneously, to the power supply line, there being one relay means for each element, thus the switches all being connected in parallel between the power supply line and the output line, whereby each switch may be pre-set to connect one of its input poles to the output line, and when its respective relay means connects that one pole to the power supply line, a signal is transmitted through that switch and through the signal output line; and selection means electrically connected to the signal output line and operative to select the particular carrier being scanned in response to a signal transmitted through any one of the switches and thus through the signal output line to the selection means.

19. A construction as defined in claim 18 and each switch having a neutral pole position to which its switch means may be selectively connected for neutralizing that switch by disengaging its switch means and output pole from both of its respective input poles.

20. An apparatus for locating and selecting data carriers carrying predetermined data, the carriers each having its respective data stored in identically located columns having fixed data positions forming rows transverse to the columns, in which the data may be located; said apparatus comprising a scanning means, a signal transmitting means, and a selection means; said scanning means comprising scanning elements, all arranged to simultaneously scan one column together and each formed to scan one row of data positions in one column, one position at a time and to separately transmit an electrical impulse in response to data scanned; a plurality of columns of identical switches, the switches in each column being equal in number to the number of data positions in a carrier column, each column of switches corresponding to a single carrier column and the switches in each column each corresponding to a specific data position in its respective data column to thus form a corresponding row of switches with one switch in each column being in each row; a power supply line and each column of switches having a signal output line; each switch having two input poles and an output, and switch means for selectively connecting either of the two input poles, but not both simultaneously, to the output which in turn is connected to the signal output line of its respective column; a two-position relay means associated with each scanner element; each of the switches in each row having one of their input poles connected to one of and the other input pole connected to the other of the relay means positions of the respective relay means of that row; each relay means being electrically connected to and operative in response to an impulse from a single scanning element for connecting one, but not both simultaneously, of the two input poles of the switches connected to it to the power supply line, thus, the switches in each column being connected in parallel between the power source and the signal output line of that column; each switch being pre-settable to connect one or neither of its poles to one of the positions of its respective relay means whereby when its respective relay means position is connected to the power supply line, a signal is transmitted through that switch and through the signal output line of its respective column of switches; selection means operative in response to a signal transmitted through any one of the switches to select the particular carrier being scanned; means for relatively moving the scanner means and carrier columns for sequentially scanning one column at a time, and means for sequentially connecting the switch column signal output lines, one at a time, to the selection means at the same time as its corresponding carrier column is scanned, whereby the selection means is operated in response to a signal transmitted through any one switch transmitting a signal through the signal output line then connected to the selection means.

21. A signal transmitting device comprising a power supply line, a plurality of pairs of signal input lines and a plurality of individual signal output lines; an identical number of identical two pole switches connected to each pair of input lines, with one pole on each switch being connected to one of its respective pair of input lines and the other pole of each switch being connected to the other of its pair of input lines to form a row of switches in each pair of input lines, each switch having an output, the outputs of each switch being connected to only one of the individual output lines, but with only one switch of each pair of input lines being connected to any one of the individual output lines to thus form a column of switches; each of the switches being selectively switchable so that only one of its pair of input lines is connected at any one time to its respective output line; a two position relay means for each pair of signal input lines, with one position connected to one of its respective pair of signal input lines, and the other position connected to the other of the respective pair of signal input lines; each of the relay means being connected to the power supply line for transmitting current through either of its two positions; and means for switching each of the relay means to either of their two positions for transmitting current through that position.

22. A construction as defined in claim 21, and each switch having an electrical means connected between the switch output and its respective output line, which electrical means is formed to pass current from the switch output to the output line, but to block any flow of current from the output line back through the switch.

References Cited in the file of this patent

UNITED STATES PATENTS

| | | |
|---|---|---|
| 1,651,180 | Bryce | Nov. 29, 1927 |
| 2,261,539 | Carroll | Nov. 4, 1941 |
| 2,539,998 | Martin et al. | Jan. 30, 1951 |
| 2,892,542 | Broide | June 30, 1959 |